United States Patent [19]

Grothaus et al.

[11] Patent Number: 5,490,973
[45] Date of Patent: Feb. 13, 1996

[54] PULSED CORONA REACTOR SYSTEM FOR ABATEMENT OF POLLUTION BY HAZARDOUS AGENTS

[75] Inventors: Michael G. Grothaus; Richard A. Korzekwa, both of Dahlgren, Va.; R. Kenneth Hutcherson, Silver Spring, Md.

[73] Assignee: The United States of America as represented by the Secretary of the Navy, Washington, D.C.

[21] Appl. No.: 252,287

[22] Filed: May 23, 1994

[51] Int. Cl.$^6$ .............................. B01D 53/32; B01J 19/12
[52] U.S. Cl. .................. 422/186.04; 422/168; 422/186; 422/186.15; 422/907
[58] Field of Search ................................. 422/168, 186, 422/186.04, 186.07, 186.15, 907

[56] References Cited

U.S. PATENT DOCUMENTS

| | | | |
|---|---|---|---|
| 4,765,965 | 8/1988 | Goudy, Jr. ................. | 422/186 |
| 4,818,498 | 4/1989 | Bachhofer et al. ................. | 422/186.2 |
| 4,859,429 | 8/1989 | Nisenson ............................. | 422/186.13 |
| 4,872,959 | 10/1989 | Herbst et al. ............................ | 204/109 |
| 4,877,588 | 10/1989 | Ditzler et al. ........................... | 422/186.19 |
| 4,886,645 | 12/1989 | Fischer et al. ...................... | 422/186.18 |
| 4,960,569 | 10/1990 | Fovell et al. ........................ | 422/186.19 |
| 5,002,739 | 3/1991 | Ditzler et al. ........................ | 422/186.19 |
| 5,009,858 | 4/1991 | Mechtersheimer ................. | 422/186.19 |
| 5,236,672 | 8/1993 | Nunez et al. ........................ | 422/186.04 |
| 5,364,600 | 11/1994 | Stiehl et al. ........................ | 422/186.07 |

*Primary Examiner*—Donald P. Walsh
*Assistant Examiner*—Daniel Jenkins
*Attorney, Agent, or Firm*—James B. Bechtel

[57] ABSTRACT

Hazardous gases within a fluent mixture such as polluted air, are treated by exposure to corona discharge within reaction zones of a plurality of reactor modules to effect chemical breakdown for pollution abatement purposes. Electrical pulse energy delivered to the reaction zones to effect corona discharge therein, is monitored to optimize pollution abatement by suppression of thermal arcing within the reaction zones.

12 Claims, 4 Drawing Sheets

PULSED CORONA REACTOR SYSTEM FOR ABATEMENT OF POLLUTION BY HAZARDOUS AGENTS

This invention relates in general to the treatment of hazardous fluent substances which have an adverse affect on the environment.

BACKGROUND OF THE INVENTION

Conventional methods of treating hazardous gases to abate environmental pollution typically utilized thermal techniques for generating conditions within a reactor under which breakdown of pollutant molecules was achieved by heating the neutral gas background to a very high temperature. Such thermal techniques were highly inefficient for relatively low pollutant concentrations and required excessively high electrical power to not only effect chemical breakdown but to cool the resultant effluent emerging from the reactor.

Other methods for breakdown of hazardous gases, generally known in the art, involve the use of non-thermal plasmas within the reactor. Dielectric barrier types of non-thermal plasma reactors are disclosed for example in U.S. Pat. Nos. 4,956,152, 4,966,666 and 5,061,462 to Keough et al., Waltonen and Suzuki, respectively. Use of a pulsed corona discharge type of reactor on the other hand, is disclosed for example in U.S. Pat. No. 4,695,358 to Mizuno et al. Such non-thermal plasma systems are extremely inefficient electrically because of rotating spark gaps, constant voltage resistive charging and use of elements to form the desired high-voltage pulses.

It is therefor an important object of the present invention to provide a more efficient system for the abatement of adverse affects on the environment of effluents such as nitrogen oxide, sulfur oxide, volatile organic compounds, chlorofluorocarbons and other hazardous gases.

Other and more particular objects of the invention are to collectively protect personnel exposed to airborne chemical and biological agents in a more effective manner.

Still other objects of the invention involve the treatment of hazardous agents for pollution abatement purposes, including the introduction of active radicals into aqueous media of a wastewater treatment system.

Pursuant to the foregoing objects, it is an additional object of the invention to more efficiently effect breakdown of hazardous substances into less hazardous by-products which can be easily removed by conventional scrubbers or filters.

SUMMARY OF THE INVENTION

In accordance with the present invention, discharge conditions within a pulsed corona reactor are controlled to optimize the efficiency of chemical breakdown of pollutants. Electrical efficiency is maximized by charging a capacitor from a constant current supply of power, by resonantly transfering energy to the reactor using hydrogen spark gap switching and by suppressing thermal arcing via disabling the power supply after the current monitor detects a streamer discharge. The foregoing operational aspects of the invention are performed within an integrated geometrical arrangement of apparatus which virtually eliminates electromagnetic interference with surrounding equipment and allows adjustment of discharge conditions within the chamber of the pulsed corona reactor in order to select optimizing pulse parameters and scaling to accommodate different flow rates of inflowing hazardous gases.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawings wherein.

DETAILED DESCRIPTION OF PREFERRED EMBODIMENTS

Figure 1:
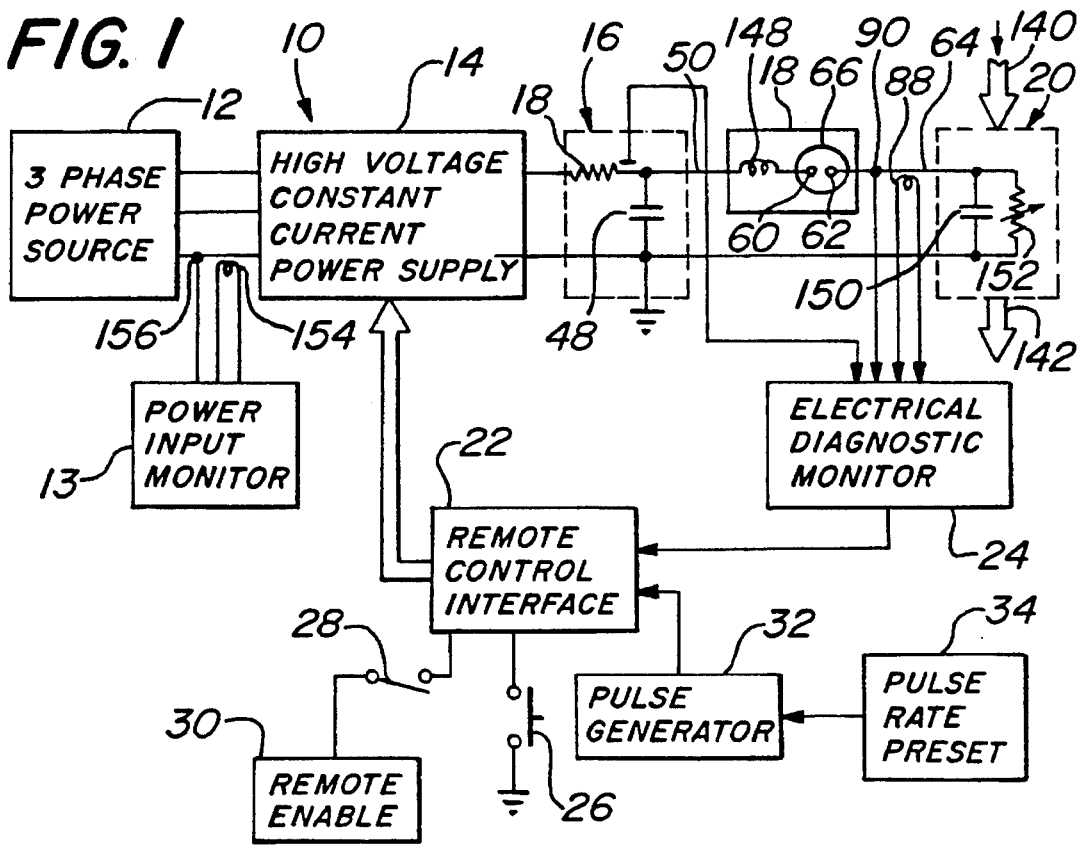
FIG. 1 is a schematic block diagram of a pulsed corona reactor system, in accordance with one embodiment of the invention.

Referring now to the drawing in detail, FIG. 1 is a schematic diagram of a pulsed corona reactor system in accordance with one embodiment of the invention, generally referred to by reference numeral 10. The system diagrammed in FIG. 1 includes a 3-phase electrical voltage source 12 monitored through unit 13 and connected to a power supply 14 through which a capacitive energy storage network 16 is charged to a high voltage. The energy storage network 16 is connected by a fast closing spark-gap type switching assembly 18 to a pulsed corona reactor 20, shown by electrical equivalent diagramming in FIG. 1. A voltage pulse is accordingly received by the reactor 20 through a switch closing gap of switching assembly 18 from the capacitive storage network 16. The power supply 14, which charges the capacitive storage network 16, is of a commercially available constant-current type such as a Maxwell Model CCDS 85ON-1-208 capable of being remotely controlled.

With continued reference to FIG. 1, control over the power supply 14 is exercised externally thereof through a remote control interface 22 to which an electrical diagnostic monitor 24 is connected. The diagnostic monitor is operatively coupled by current and voltage probes as diagrammed to the output of the switching assembly 18 for fast current detection of each switching event in order to provide a corresponding disabling signal to the remote control interface 22. The power supply 14 is thereby disabled from the capacitive storage network 16 between charge commands. In order to implement application of the network charge commands thereto, the control interface 22 is connectable to ground through a high-voltage on/off control switch 26 and through switch 28 to a remote programmed enable unit 30. Also, the control interface 22 is connected to a pulse generator 32 to effect timing control through power supply 14 over the aforementioned voltage pulse applied to the reactor 20 from the capacitive storage network 16 through switching assembly 18. A fast-rising voltage pulse is accordingly delivered to the reactor 20 at a predetermined repetition rate established by a pulse rate preset 34 connected to the pulse generator 32.

Figure 2:
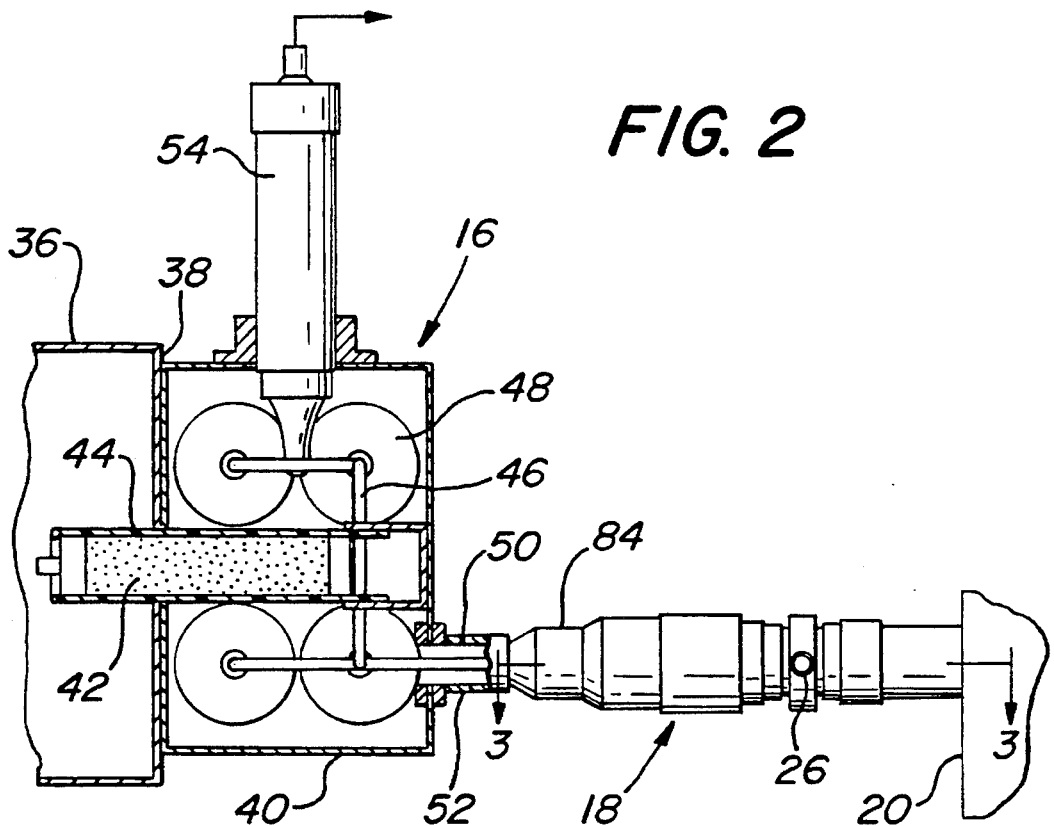
FIG. 2 is a partial side view of an integrated arrangement of apparatus for practicing the invention as diagrammed in FIG. 1, with parts shown in section.

Referring now to the integrated apparatus arrangement depicted in FIG. 2, a housing 36 within which the power supply 14 is enclosed has an end plate 38 attached to an abutting end of an aluminum housing 40 enclosing the capacitive storage network 16. An electrical resistance 42 (also diagrammed in FIG. 1) is enclosed within a polyvinylchloride insulator tube 44 and is electrically connected to the power supply. The resistance 42 is made of a carbon composition to protect the power supply from voltage reversals according to one embodiment and extends into housing 40. The resistor dissipates minimal energy due to the constant current power supply and could be replaced with a free-wheeling diode. Copper bus strips 46 electrically connect the resistance 42 in parallel to a plurality of storage capacitors forming capacitance 48 of the capacitive storage network 16. A connector cable 50 extends from the bus strips 46 through a brass feedthrough 52 interconnecting housing 40 with the high voltage switching assembly 18 as shown in FIG. 2. The storage capacitors of network 16 may be made of commercially available, high-frequency barium titanate (2-nF), and are independently removable from the network 16 to change the amount of energy to be stored.

The high voltage switching assembly 18, interconnects the capacitive storage network 16 with the reactor 20 as shown in FIG. 2. The charging voltage at the storage network 16 is measured by a high voltage probe 54 of a known type, such as a Tektronix Model 6015, from which charging voltage signals are fed to the diagnostic monitor 24 diagrammed in FIG. 1.

Figure 3:
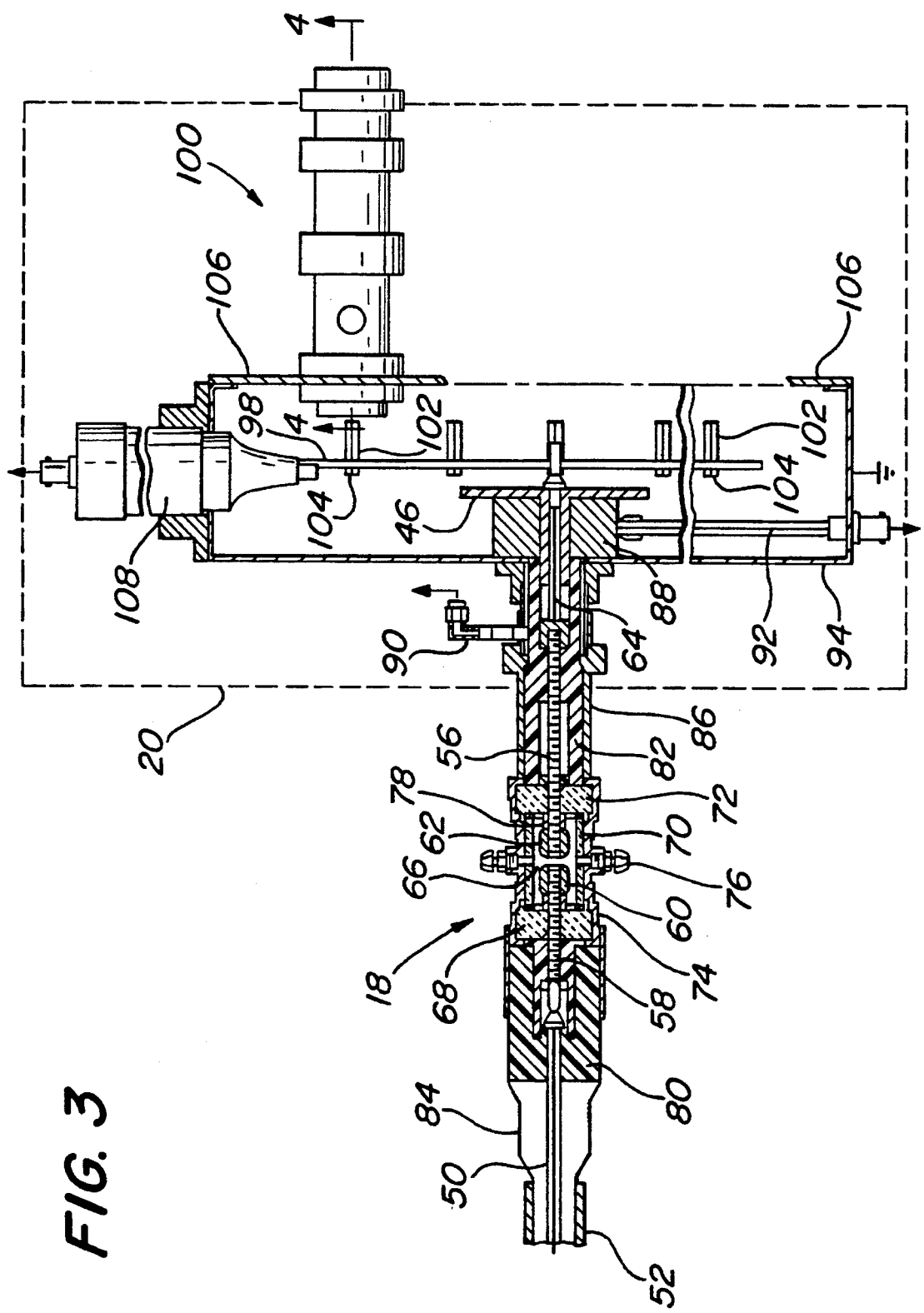
FIG. 3 is a partial section view of the apparatus shown in FIG. 2, taken substantially through a plane indicated by section line 3—3 in FIG. 2.

Referring now to FIG. 3 in particular, the output cable 50 from the capacitive storage network 16 extends into the high voltage switching assembly 18 and is electrically connected by a screw rod 58 to spark gap electrode 60 threadedly mounted thereon. The other electrode 62 is threadedly mounted on the adjacently spaced end of an axially aligned rod 56 electrically connected to the reactor 20 through a cable 64. The two electrodes 60 and 62, made from a copper tungsten alloy such as Elkonite, are positioned within a hydrogen-filled gas chamber 66 of the switching assembly within which the spark gap is established. The chamber 66 is enclosed by aluminum-oxide ceramic insulators 68, 70 and 72 held assembled together within an outer stainless steel housing 74. O-ring seals between the housing 74 and insulators 68, 70 and 72 maintain the gap chamber 66 sealed while pressurized with hydrogen gas introduced through inlet fittings 76 projecting radially from housing 74. By means of brass spacers 78 located on the threaded rods 56 and 58 axially between the insulators 68, 72 and the electrodes 60 and 62, the spacing of the spark gap between the electrodes may be adjusted within the pressurized hydrogen-filled chamber 66 to achieve switching operation at a repetition rate of up to 1 kHz and enable increased throughput rates in the reactor 20 by virtue of the delivery thereto of nano-second risetime pulses. Teflon spacers 71, 80 and 82 through which rods 56 and 58 extend to the electrodes, augment the pressure-tight sealing of chamber 66 as well as insulate the rods 56 and 58 while conducting high voltage current between the storage network 16 and the reactor 20. The insulating spacers 71, 80 and 82 are respectively retained in position within axial metal housing sections 84 and 86 of the switching assembly 18, which is thereby connected to the circuit housing 40 by fitting 52 and to the reactor 20.

With continued reference to FIG. 3, the voltage delivered to the reactor 20 by cable 64 of the switching assembly 18 is measured through a fast capacitive probe 88 connected to the diagnostic monitor 24, while a self-integrating current probe 90 measures current by supply of a corresponding signal to the monitor 24 through cable 92 extending from an aluminum housing box 94 of the reactor to which the housing section 86 of the switching assembly is attached. The voltage probe 88 is mounted on housing section 86 to monitor voltages having rise-times in the sub-nanosecond range and an attenuation ratio of approximately 70000 to 1. The current probe 90, on the other hand, may be a Pearson Model 2877 or 4100 capable of resolving either a 2-ns or a 10 ns rise time signal with a sensitivity of 1V/A. The housing of current probe 90 is maintained at ground potential of the box 94 and is insulated by a Teflon collar 96 from a high voltage header plate 98 to which the output cable 64 from the switching assembly 18 is electrically connected.

The reactor 20 as shown in FIG. 3, includes a plurality of individual corona discharge modules 100 electrically connected in parallel to the switching assembly 18 by the high voltage header plate 98. An electrical voltage supply cable 102 accordingly extends to each module 100 and is connected to the header plate 98 by a nut 104. The reactor modules are removably mounted on an electrically grounded manifold plate 106 secured to and closing the housing box 94. An additional high voltage probe 108, such as a Tektronix 6015, may be connected to the header plate 98 as shown in FIG. 3 for redundant high voltage measurement purposes. Enclosure of the high voltage circuitry portion of the reactor in the metallic box 94 closed by manifold plate 106 provides shielding for any surrounding sensitive electronics from stray electric fields within the box 94.

Figure 4:
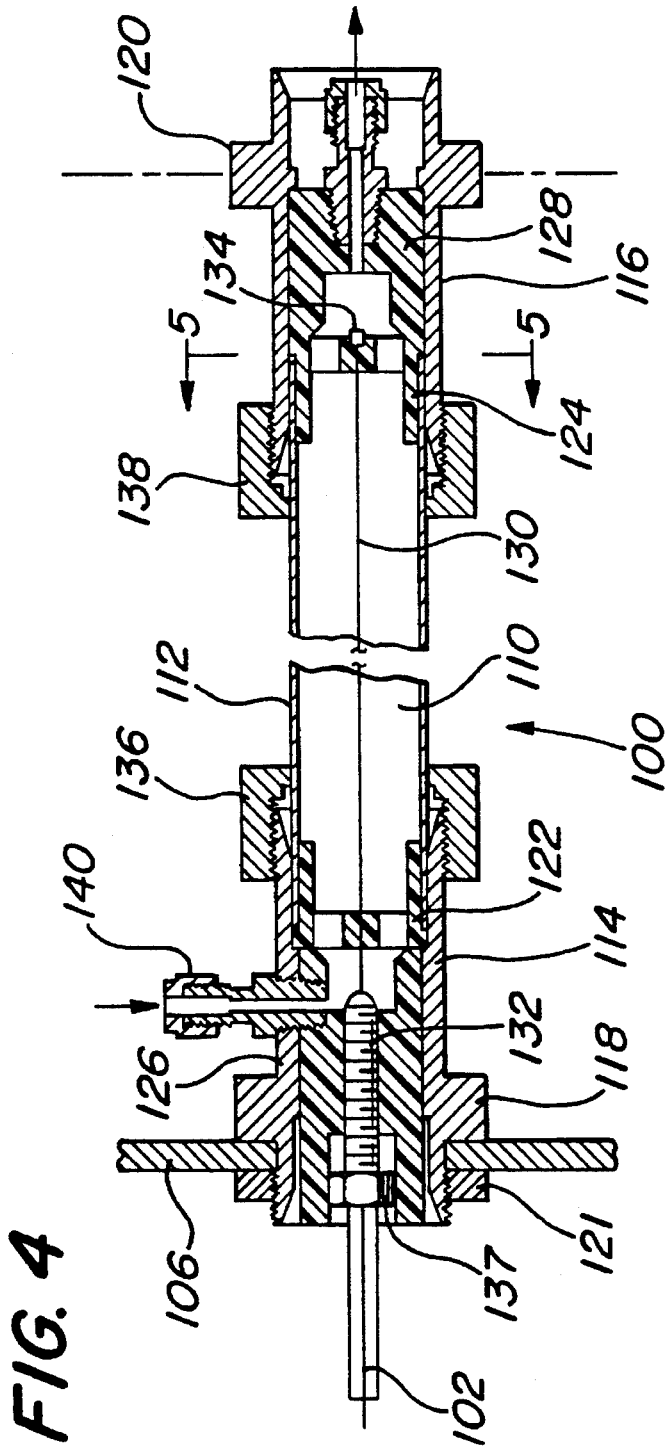
FIG. 4 is a partial section view taken substantially through a plane indicated by section line 4—4 in FIG. 3.
Figure 5:
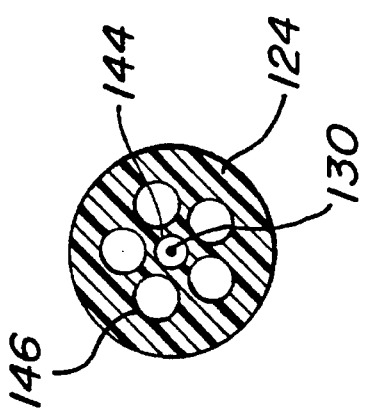
FIG. 5 is a transverse section view taken substantially through a plane indicated by section line 5—5 in FIG. 4.

Referring now to FIGS. 4 and 5, each of the reactor modules 100 encloses a streamer corona discharge reaction zone 110 within a stainless steel electrode tube 112. Housing sections 114 and 116 of the module are secured by fittings 136 and 138 to the opposite ends of the tube 112 for support and electrical grounding thereof by the manifold plate 106. Thus, radially projecting formations 118 and 120 are respectively provided on the housing sections 114 and 116 so that housing section 114 may be clamped to the plate 106 by formation 118 and a brass collar nut 121 as shown in FIG. 4. Teflon insulator spacers 122 and 124 are positioned within the tube 112 at opposite ends thereof. Also, Teflon feedthrough fittings 126 and 128 are respectively positioned within the housing sections 14 and 116 in axial abutment with the spacers 122 and 124 therein. A discharge electrode wire 130, made of stainless steel, extends axially through the center of zone 110 between a stainless steel tensioning screw 132 and a stainless steel button 134 at opposite axial ends of the tube 112. The tensioning screw 132 is threaded through fitting 126 from a brass nut 137 through which the cable 102 is electrically connected to wire 130 for supply of voltage pulses thereto. The fittings 126, 128 and spacers 122, 124 are held compressed against opposite ends of the tube 112 to seal zone 110 by tightening of the Swagelok fittings 136 and 138.

Hazardous gas is introduced into the sealed reactor zone 110 through a Teflon gas inlet fitting 140 projecting radially through an opening in housing section 114 and threadedly mounted in spacer 126. Hazardous gas treated by exposure to the high energy electrons within the corona discharge zone 110 emerges therefrom through a central passage in spacer 128 and gas discharge fitting 142. The spacers 122 and 124 have central openings 144 through which the electrode wire 130 extends and circumferentially spaced baffle openings 146 through which distributed gas flow is conducted into and out of the corona discharge zone 110 as more clearly seen in FIG. 5. When the voltage delivered to the reactor modules 100 from the header plate 98 through the cables 102 exceeds a corona onset voltage level, multiple streamers along the length of the electrode wires 130 within zones 110 are initiated to form the steamer corona discharge field within which the hazardous gas is treated.

Operation of system 10 involves initiation of a charge cycle for the storage capacitance 48 of network 16, as diagrammed in FIG. 1, when (a) the input from remote enable 30 goes high by closing of switch. 28, (b) the high voltage on/off signal goes momentarily low by closing of switch 26, and (c) the high voltage inhibit signal from pulse generator 32 to the remote control interface 22 goes low. The constant current power supply 14 then charges the capacitance 48 to a high voltage level determined by a set signal delivered by the remote control interface 22 to the power supply 14. At a self-break voltage level of the switching assembly 18, set by the spark gap spacing between the electrodes 60 and 62 and gas pressure in the gap chamber 66, switch closure occurs to rapidly and resonantly charge capacitance 150 of reactor 20 through stray inductance 148 associated with the switching assembly 18. Since the reactor capacitance 150 is much smaller in size than the capacitance 48 of the storage network 16, some voltage multiplication is to be expected. The risetime of the charging voltage applied to the reactor will be affected by the stray inductance 148 of the switching assembly 18 which is minimized by the coaxial geometry of the switching assembly 18 as hereinbefore described with respect to FIG. 3.

Upon occurrence of spark-gap breakdown in switching assembly 18 to effect switch closure as aforementioned, current flow to the reactor 20 is detected by monitor 24 to effect momentary disablement of the power supply 14 by feedback signal control from monitor 24 through interface 22 and electrically isolate the power supply from the reactor in order to allow spark gap recovery and switch opening of switching assembly 18. The capacitance 150 of the reactor 20, as electrically diagrammed in FIG. 1, is electrically connected in parallel with an impedance 152 that represents the variable resistance of the gas discharge. Once the streamer corona onset threshold is exceeded, current is conducted in the reactor and removal of the stored charge at the capacitance 48 of switching assembly 18 and capacitance 150 of the reactor assembly 20 is achieved in about 150–200 nanoseconds. The voltage at the capacitance 150 of the reactor after reaching the desired charge level decays to the corona onset threshold until another cycle occurs and the corona onset threshold is again attained. Since the grounded reactor impedance 152 is very large, it maintains the reactor capacitance 150 at typically 8–10 kV determined by the corona onset threshold. The power input to the entire system 10 is determined by monitor 13 through current and voltage probes 154 and 156, respectively located on a 208 Volt, 3-phase input line to the power supply 14 from source 12. The actual energy per pulse delivered to the reactor is calculated through monitor 24 by integrating with respect to time the product of voltage and current respectively measured by probes 88 and 90 as aforementioned, in order to determine the high "wall-plug" efficiency of the system. A reactor 20 provided with ten modules 100 for example, accommodates a gas inflow rate of 50 liters per minute in the disclosed arrangement. It has been determined that in such an arrangement the "wall-plug" efficiency is greater than 85–90% for a reactor voltage of 26 kV and a pulse repetition frequency of 750 Hz. Such efficiency is partly attributable to the suppression of thermal arcing within the reactor module 100 during streamer discharge therein because of the feedback signal control excerise over the constant current power supply 14 in response to monitoring of current to the to the reactor by monitor 24. Electrical efficiency is also attributable to the use of constant current charging, resonant energy transfer, low-loss switching and high reactor center wire to ground impedance.

Figure 6:
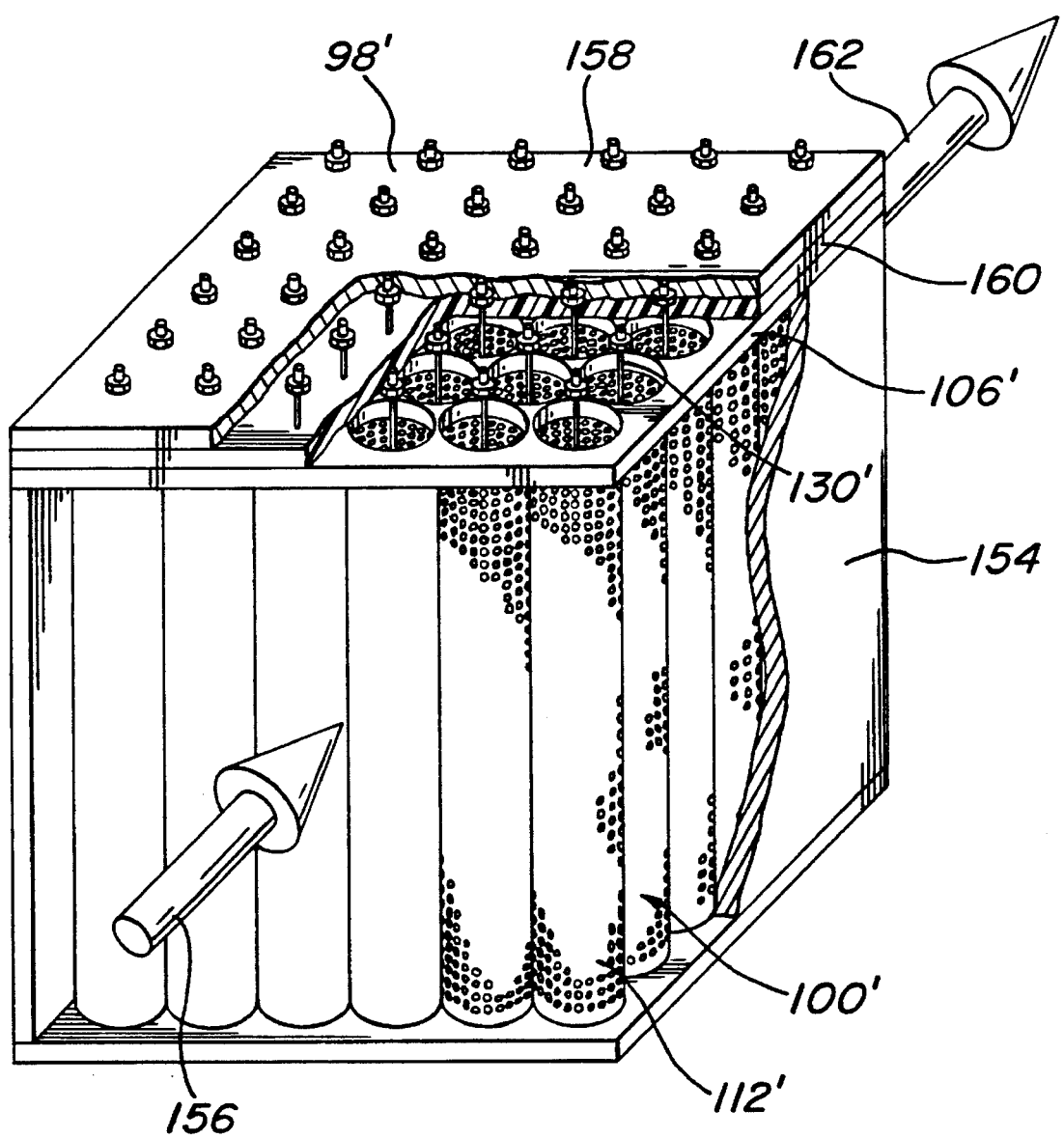
FIG. 6 is a partial perspective view of a modified form of the pulse corona reactor shown in FIG. 3.

An alternative reactor 20' for the system depicted in FIG. 1, is illustrated in FIG. 6, whereby larger inflow rates of gas may be accommodated. According to this embodiment, the reactor has a larger number of tubular reactor modules 100' through which corona discharge producing electrode wires 130' extend. Each module 100' has an outer electrode tube 112' made of perforated stainless steel. The tubes 112' are exposed between side walls 154 of the reactor to an inflow 156 of polluted air, perpendicular to the axes of the tubes and the electrode wires 130' extending therethrough. The high voltage pulses, as hereinbefore described, are applied to the wires 130' between a reactor header plate 98', to which the wires are connected by fasteners 158, and a grounding plate 106' on which the tubes 112' are supported. The plates 98' and 106' are separated by an insulator plate 160.

The crossed flow arrangement of electrode tubes 112' between inflow 156 and outflow 162 as shown in FIG. 6, ensures graceful degradation of the reactor since a given gas volume traverses several tubes rather than just one as in the case of the reactor 20 shown in FIGS. 3–5. The crossed flow arrangement of FIG. 6 furthermore induces turbulent mixing to homogenize pollution degradation characteristics of the reactor 20, the staggered tube geometry enhancing the probability that the polluted flow passes close to the field-enhanced region around the center wire.

Obviously, other modifications and variations of the present invention may be possible in light of the foregoing teachings. It is therefore to be understood that within the scope of the appended claims the invention may be practiced otherwise than as specifically described.

What is claimed is:

1. A system for treating a polluted fluent within a plurality of reactor modules by exposure to streamer corona discharge comprising an electrode wire extending through a reaction zone enclosed within a tubular electrode in each of said reactor modules; power controlled means for supply of electrical energy to the reactor modules, header means connecting the power controlled means in parallel to the electrode wires of the reactor modules for transfer of said electrical energy thereto, mounting means connected to the tubular electrodes for support and grounding thereof in spaced adjacency to the header means and insulator means through which the electrode wires extend into the reaction zones of the reactor modules for electrically insulating the header means and the mounting means from each other.

2. The combination as defined in claim 1 wherein said power controlled means includes a source of electrical voltage, capacitive storing means operatively connected to the source for generation of voltage pulses, switching means connected to the capacitive storing means for delivering the voltage pulses generated by the capacitive storing means to the reactor modules, means for monitoring said transfer of the electrical energy from the source to the reactor modules, and interfacing control means operatively connected to the monitoring means for conditioning said generation of the voltage pulses to optimize said transfer of the electrical energy to the reactor modules.

3. The combination as defined in claim 2 wherein said insulator means includes spacers fixed to the tubular electrodes at opposite axial ends thereof having baffles through which flow of the polluted fluent is directed substantially parallel to the electrode wires.

4. The combination of claim 3 wherein said mounting means includes a manifold plate, housing sections respectively connected to the tubular electrodes in enclosing relation to the insulator means, means for clamping the housing sections to the manifold plate, a housing box connected to the switching means and the manifold plate in enclosing relation to the header means and means for insulating the header means from the switching means and the monitoring means.

5. The combination as defined in claim 1 wherein said insulator means includes spacers fixed to the tubular electrodes at opposite axial ends thereof, having baffles through which flow of the polluted fluent is directed substantially parallel to the electrode wires.

6. The combination as defined in claim 2 wherein said mounting means includes a manifold plate, housing sections respectively connected to the tubular electrodes in enclosing relation to the insulator means, means for clamping the housing sections to the manifold plate, a housing box connected to the switching means and the manifold plate in enclosing relation to the header means and means for insulating the header means from the switching means and the monitoring means.

7. The combination of claim 1 wherein said insulator means comprises an insulating plate spacing the header means from the mounting means, said tubular electrodes being perforated between opposite axial ends thereof through which flow of the polluted fluent is conducted into the reaction zones transversely of said electrode wires therein.

8. A system for treating a polluted fluent within a plurality of reactor modules by exposure to streamer corona discharge comprising an electrode wire extending through a reaction zone enclosed within a tubular electrode in each of said reactor modules; a header plate through which electrical energy is delivered to the reactor modules in parallel, mounting means connected to the tubular electrodes for support thereof in spaced adjacency to the header plate and insulator means through which the electrode wires extend into the reaction zones of the reactor modules for electrically insulating the header plate and the mounting means from each other.

9. The combination as defined in claim 8 wherein said insulator means includes spacers fixed to the tubular electrodes at opposite axial ends thereof having baffles through which flow of the polluted fluent is directed substantially parallel to the electrode wires.

10. The combination as defined in claim 9 wherein said mounting means includes a manifold plate, housing sections respectively connected to the tubular electrodes in enclosing relation to the insulator means and means for clamping the housing sections to the manifold plate.

11. The combination as defined in claim 10 wherein said insulator means comprises an insulating plate spacing the header plate from the mounting means, said tubular electrodes being perforated between opposite axial ends thereof through which flow of the polluted fluent is conducted into the reaction zones transversely of said electrode wires therein.

12. A system for treating a polluted fluent within a reactor module by exposure to streamer corona discharge within a reaction zone comprising a source of electrical voltage, capacitive storing means operatively connected to the source for generation of voltage pulses, switching means connected to the capacitive storing means for delivering the voltage pulses to the reaction zone of the reactor module to produce said streamer discharge therein, means for monitoring said streamer discharge, and feedback control means operatively connected to the monitoring means for conditioning said generation of the voltage pulses to suppress thermal arcing within the reaction zone and thereby optimize transfer of electrical energy to the reactor module from the source.

\* \* \* \* \*